United States Patent
Kim et al.

(10) Patent No.: US 9,380,214 B2
(45) Date of Patent: Jun. 28, 2016

(54) IMAGE PHOTOGRAPHING APPARATUS AND METHOD THEREOF

(71) Applicant: SAMSUNG ELECTRONICS CO., LTD., Suwon-si (KR)

(72) Inventors: Jae-gon Kim, Suwon-si (KR); Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 14/168,078

(22) Filed: Jan. 30, 2014

(65) Prior Publication Data

US 2015/0029379 A1 Jan. 29, 2015

(30) Foreign Application Priority Data

Jul. 26, 2013 (KR) .................. 10-2013-0088658

(51) Int. Cl.
*H04N 5/232* (2006.01)
*H04N 1/00* (2006.01)
*H04N 101/00* (2006.01)

(52) U.S. Cl.
CPC ....... *H04N 5/23293* (2013.01); *H04N 1/00347* (2013.01); *H04N 5/232* (2013.01); *H04N 2101/00* (2013.01); *H04N 2201/0084* (2013.01)

(58) Field of Classification Search
CPC .................... H04N 5/23293; H04N 5/23296
USPC ............. 348/211.99–211.14, 333.01–333.06
See application file for complete search history.

(56) References Cited

U.S. PATENT DOCUMENTS

| | | | |
|---|---|---|---|
| 2002/0154226 A1* | 10/2002 | Gohda | 348/231.3 |
| 2004/0113915 A1 | 6/2004 | Ohtsuki et al. | |
| 2005/0195216 A1* | 9/2005 | Kramer et al. | 345/619 |
| 2010/0097322 A1* | 4/2010 | Hu et al. | 345/173 |
| 2010/0146389 A1 | 6/2010 | Yoo et al. | |
| 2011/0007069 A1 | 1/2011 | Lee | |
| 2012/0306722 A1* | 12/2012 | Kim et al. | 345/1.2 |
| 2013/0155187 A1 | 6/2013 | Skyberg | |
| 2014/0327792 A1* | 11/2014 | Mulloni et al. | 348/211.8 |

FOREIGN PATENT DOCUMENTS

| | | |
|---|---|---|
| JP | 2004-199142 A | 7/2004 |
| JP | 2005-192015 A | 7/2005 |
| KR | 10-1070274 B1 | 10/2011 |
| KR | 10-2012-0105201 A | 9/2012 |

OTHER PUBLICATIONS

International Search Report for PCT/KR2014/006699 dated Nov. 18, 2014 [PCT/ISA/210].
Written Opinion for PCT/KR2014/006699 dated Nov. 18, 2014 [PCT/ISA/237].
Communication from the European Patent Office issued Jan. 30, 2015, in a counterpart European Application No. 14154099.7.

* cited by examiner

*Primary Examiner* — Tuan Ho
(74) *Attorney, Agent, or Firm* — Sughrue Mion, PLLC

(57) ABSTRACT

An image photographing apparatus and method are provided. The image photographing method includes inputting images having different view points for a subject; displaying a first image among the images; in response to an input of a user command, changing the first image to a second image having a view point which is different from that of the first image, and displaying the second image; and in response to an input of a photographing command, acquiring the second image.

25 Claims, 14 Drawing Sheets

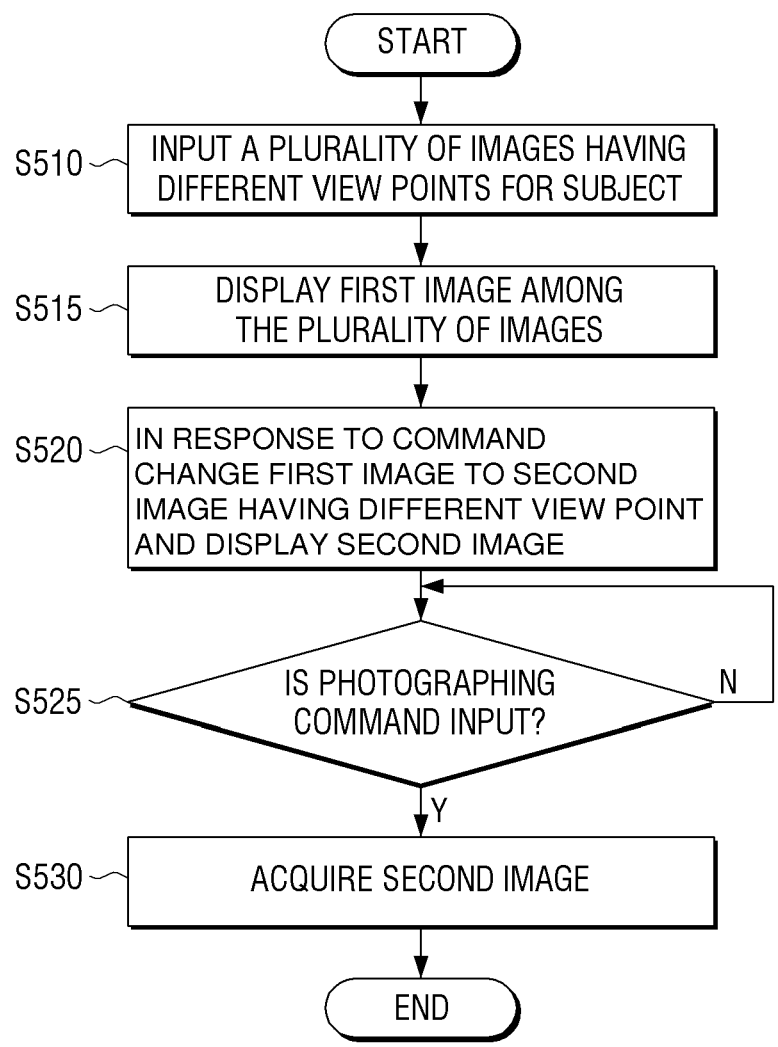

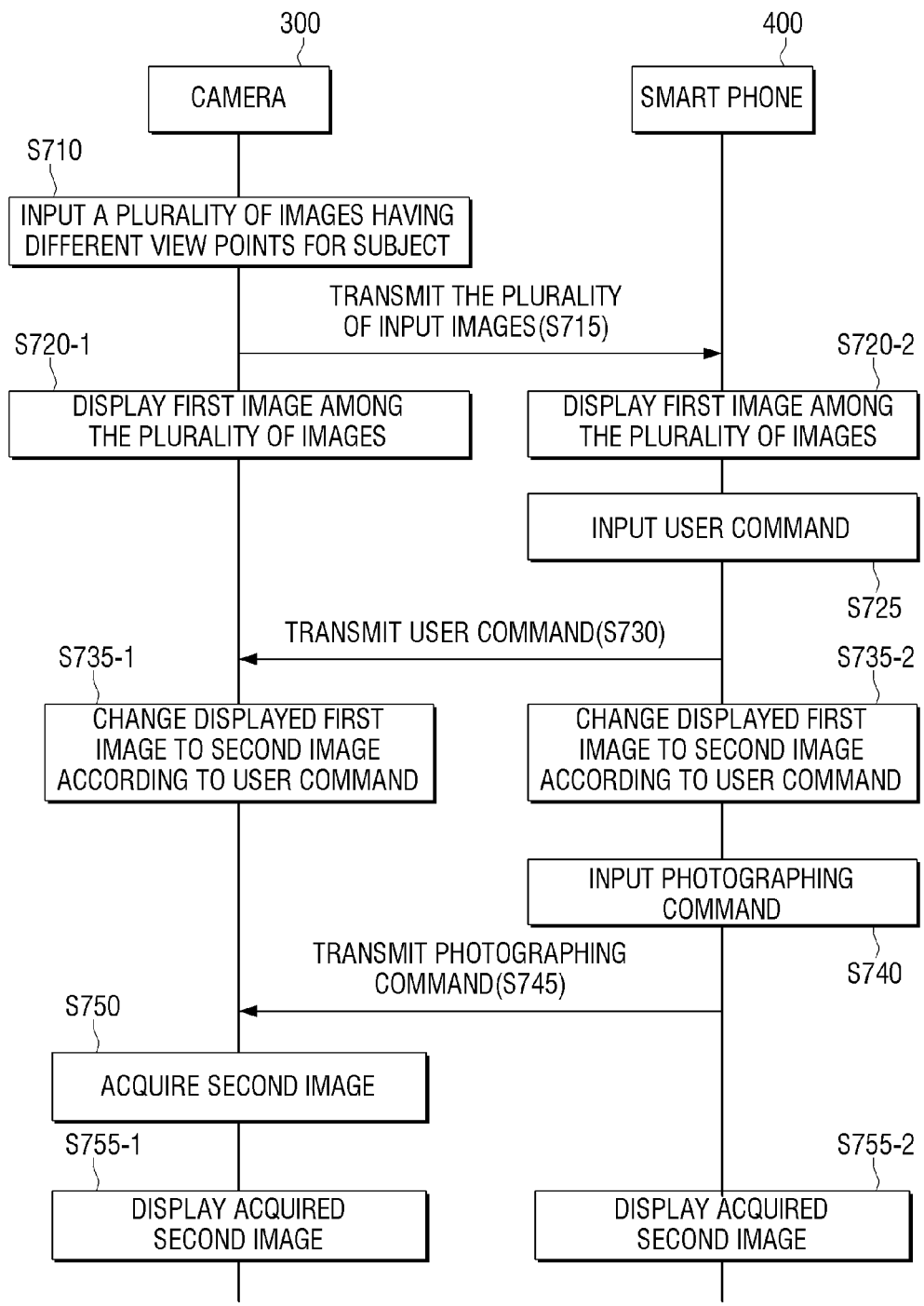

IMAGE PHOTOGRAPHING APPARATUS AND METHOD THEREOF

CROSS-REFERENCE TO RELATED APPLICATIONS

This application claims priority from Korean Patent Application No. 10-2013-0088658, filed on Jul. 26, 2013, in the Korean Intellectual Property Office, the disclosure of which is incorporated herein by reference in its entirety.

BACKGROUND

1. Field

Apparatuses and methods consistent with exemplary embodiments relate to an image photographing apparatus and a photographing method thereof, and more particularly, to an image photographing apparatus capable of changing a photographing view point for a subject without moving the subject and the image photographing apparatus and a photographing method thereof.

2. Description of the Related Art

When a user takes a picture of a subject, a direction, angle or height in which the user watches the subject using an image photographing apparatus is referred to as a photographing view point.

In the related art, the image photographing apparatus takes a picture of a subject at a single view point. When the user wants to change the view point, the user has to physically change the position of the image photographing apparatus or the position of the subject. Consequently, it is difficult to change the photographing view point in detail.

While the user can rearrange the position of the image photographing apparatus and/or the position of the subject to change the photographing view point, there are disadvantages in that it is difficult to change the photographing view point by simple manipulation without physically changing the positions of the image photographing apparatus and the subject, or to simply change a pre-stored image to an image taken at a photographing view point that the user wants.

SUMMARY

Exemplary embodiments overcome the above disadvantages and other disadvantages not described above. Also, the exemplary embodiments are not required to overcome the disadvantages described above, and an exemplary embodiment may not overcome any of the disadvantages described above.

One or more exemplary embodiments provide an image photographing apparatus capable of changing a photographing view point for a subject without moving the subject and the image photographing apparatus and a photographing method thereof.

According to an aspect of an exemplary embodiment, there is provided an image photographing method of an image photographing apparatus, the image photographing method including: inputting a plurality of images having different view points for a subject; displaying a first image among the plurality of images; in response to an input of a user command, changing the first image to a second image having a view point which is different from that of the first image, and displaying the second image; and in response to an input of a photographing command, acquiring the second image.

The acquiring the second image may comprise storing the second image as a representative image, and storing the remaining images among the plurality of images except for the second image as supplementary images.

The method may further comprise, in response to an input of another user command while the representative image is displayed, displaying one of the supplementary images according to the another user command; and in response to an input of a storing command, storing the displayed one of the supplementary images as a new representative image.

The first image may be an image of a front of the subject, and when the user command is a touch input dragging to the left, the second image is an image of the subject photographed from the right, and when the user command is a touch input dragging to the right, the second image is an image of the subject photographed from the left.

The displaying the first image may comprise displaying a view point indicating user interface (UI) that indicates a view point at which the first image is captured, or displaying the second image comprises displaying a view point indicating UI that indicates a view point at which the second image is captured.

The view point indicating UI may comprise an indicator that represents a photographing view point, and the indicator may change at least one of position and shape according to the user command.

The method may further comprise transmitting the plurality of input images to an external device, and the input of the user command may comprise receiving the user command to change the first image to the second image from the external device.

The inputting of the photographing command may comprise receiving the photographing command from the external device.

In response to the external device receiving the plurality of images from the image photographing apparatus, the external device may display the first image, and in response to receiving a command input to the external device for changing the first image, the external device may change the first image to the second image and display the second image on the external device, and may transmit the command to the image photographing apparatus as the user command.

The inputting the plurality of images may comprise inputting the plurality of images through a plurality of lenses.

According to an aspect of another exemplary embodiment, there is provided an image photographing method of an image photographing apparatus, the image photographing method including: inputting a plurality of images having different view points for a subject; displaying a first image among the plurality of images; and in response to an input of a user command, changing the first image to a second image having a view point which is different from that of the first image and displaying the second image.

According to an aspect of another exemplary embodiment, there is provided an image photographing apparatus including: an image inputter configured to input a plurality of images having different view points for a subject; a display configured to display a first image among the plurality of images input by the image inputter; an inputter configured to input a user command; and a controller configured to, in response to a user command, change the first image to a second image having a view point which is different from that of the first image and control the display to display the second image, and, in response to a photographing command, acquire the second image.

The image photographing apparatus may further comprise a storage, and in response to the input of the photographing command, the controller may store in the storage the second image as a representative image, and store in the storage the remaining images among the plurality of images except for the second image as supplementary images.

In response to another user command input while the representative image is displayed, the controller may control the display to display one of the supplementary images according to the another user command; and in response to a storing command being input, the controller may store in the storage the one of the supplementary images as a new representative image.

The first image may be an image of a front of the subject, and when the user command is a touch input dragging to the left input through the inputter, the second image may be an image of the subject photographed from the right, and when the user command is a touch input dragging to the right input through the inputter, the second image may be an image of the subject photographed from the left.

The display may be further configured to display a view point indicating user interface (UI) that indicates a view point at which an image is captured.

The view point indicating UI may comprise an indicator that represents a photographing view point, and the indicator may change at least one of position and shape according to the user command.

The image photographing apparatus may further comprise a communicator configured to transmit the plurality of input images to an external device, and the controller may control the communicator to receive the user command from the external device, and may change an image to display from the first image to the second image according to the received user command.

The controller may receive the photographing command from the external device, and in response to the received photographing command, may acquire the second image.

In response to receiving the plurality of images from the image photographing apparatus, the external device may display the first image, and in response to receiving a command input to the external device for changing the first image, the external device may change the first image to the second image and display the second image on the external device, and may transmit the command to the image photographing apparatus as the user command.

The image inputter may comprise a plurality of lenses, and the controller may control the image inputter to input the plurality of images having the different view points through the plurality of lenses.

The user command may be input through the inputter, and the photographing command may be input through the inputter.

According to an aspect of another exemplary embodiment, there is provided a system including a plurality of image photographing apparatuses, each image photographing apparatus being an image photographing apparatus according to claim 12, and each image photographing apparatus further comprising a communicator configured to communicate with the other image photographing apparatuses using one or more communication protocols, wherein the controller of one of the image photographing apparatuses receives images from the other image photographing apparatuses through the communicator of the one image photographing apparatus, and controls the display of the one image photographing apparatus to display the received images concurrently in respective different portions of the display, and in response to a user command input to the one image photographing apparatus with respect to a displayed image of one of the other image photographing apparatuses, the controller controls the display to change the displayed image an image having a different view point from the displayed image.

BRIEF DESCRIPTION OF THE DRAWING FIGURES

The above and/or other aspects will be more apparent by describing certain exemplary embodiments with reference to the accompanying drawings, in which:

FIG. 5 is a flowchart of a photographing method of the image photographing apparatus according to an exemplary embodiment;

FIG. 7 is a sequence diagram showing an example of the photographing method of the image photographing apparatus according to an exemplary embodiment;

DETAILED DESCRIPTION

Figure 1:
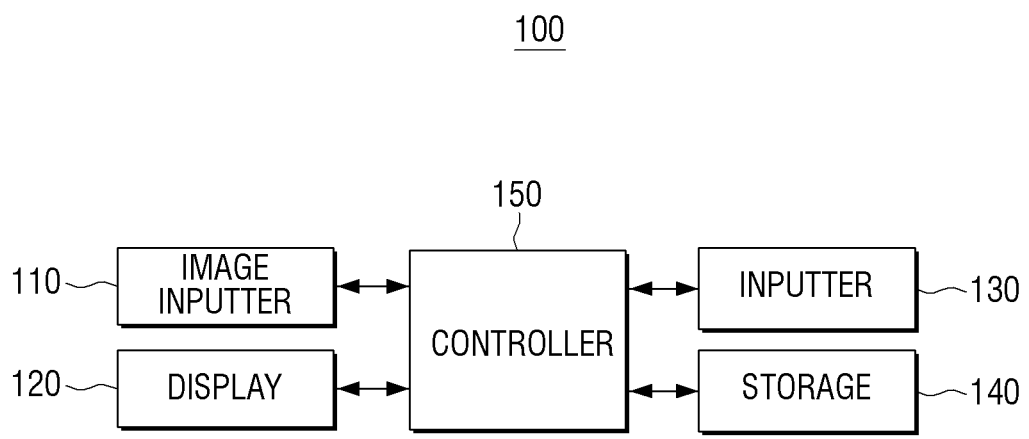
FIG. 1 is a block diagram of a configuration of an image photographing apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the inventive concept. Thus, it is apparent that the exemplary embodiments can be carried out without those specifically defined matters. Also, well-known functions or constructions are not described in detail since they would obscure the inventive concept with unnecessary detail.

FIG. 1 is a block diagram of a configuration of an image photographing apparatus according to an exemplary embodiment. As shown in FIG. 1, an image photographing apparatus 100 may include an image inputter 110, a display 120, an inputter 130, a storage 140, and a controller 150. The image photographing apparatus 100 may be a digital camera, but this is merely an example. The image photographing apparatus 100 may be implemented with diverse electronic devices having the image inputter 110, such as, for example, a camcorder, a smart phone, a tablet personal computer (PC), a notebook PC, and a personal digital assistant (PDA).

The image inputter 110 inputs an image acquired by taking a picture of a subject that the user wants using the image photographing apparatus 100. More specifically, the image inputter 110 may input an image of the subject by converting an optical signal incident through a lens into an electrical signal using an image sensor. The "subject" denotes all the objects including a main subject and a background in a generated photographed image.

In particular, the image inputter 110 may input a plurality of images acquired by the user watching the subject that the user wants to photograph at different view points. The view point includes a direction, angle or height in which the user watches the subject using the image photographing apparatus 100. In other words, when images of a subject photographed at diverse view points using a time of flight sensor, a multi photo diode, or a device capable of light field capture are input, and when the subject is a person, the image inputter 110 may input the images acquired by watching the person in different directions, at different angles, or at different heights on the basis of an image acquired by watching the front of the person.

The display 120 displays an image input by the image inputter 110. The display 120 may display a currently input image in live view, display an image acquired according to the user's photographing command, or display an image which is stored in the storage 140 by downloading over wireless communication or by connecting the image photographing apparatus 100 to an electronic device.

In addition, the display 120 may display a view point indicating user interface (UI) to show the user a view point at which an image is captured. The view point at which the image is captured is a concept that includes a view point at which the image is input through the image inputter 110, and a view point at which the image is acquired according to a photographing command.

The view point indicating UI may include an indicator to represent the photographing view point. For example, the indicator may be formed using a circle, an arrow, or any indicating shape.

The inputter 130 inputs a user command to control the image photographing apparatus 100. In particular, the inputter 130 may input a user command to change a photographing view point of an image displayed on the display 120. For example, when the inputter 130 is implemented with a touch panel and when a touch and drag command is input through the inputter 130, the controller 150 may change a view point of a displayed image according to the input touch and drag command.

In another exemplary embodiment, the inputter 130 may input a user command in sound such as voice, or in movement, inclination, or rotation of the image photographing apparatus 100 detected by a sensor 160.

The storage 140 stores an image input through the image inputter 110, an image acquired according to a photographing command, as well as diverse modules to drive the image photographing apparatus 100. In particular, the storage 140 may store a plurality of images having different view points input through the image inputter 110. More specifically, among the plurality of images having different view points input through the image inputter 110, the storage 140 may store one of the plurality of images as a representative image and store the remaining images as supplementary images according to a user command. In addition, even after storing the representative image, the storage 140 may store one of the stored supplementary images as a representative image according to a user command.

The controller 150 controls the overall operations of the image photographing apparatus 100 according to a user command input through the inputter 130. The controller 150 may be implemented by one or more microprocessors, or by one of more central processing units (CPU).

More specifically, when the user inputs a user command (e.g. a command to turn on the camera) to input an image through the inputter 130, the controller 150 may control the image inputter 110 to input an image of a subject according to pre-stored photographing conditions. In particular, the controller 150 may control the image inputter 110 to input a plurality of images having different view points with respect to the same subject. For example, when the subject is a person, the controller 150 may control the image inputter 110 to input a representative image at a view point of an image captured at the front of the person and input supplementary images at different view points in all directions such as upper, lower, left and right directions at the front of the person. The changed degree of the photographing view point may vary according to types of a lens or a photographing sensor included in the image inputter 110, or according to a user command input through the inputter 130.

In addition, the controller 150 may control the display 120 to display an image input to the image inputter 110 in live view or display an image stored in the storage 140.

When a user command is input to change a view point of an image displayed on the display 120 in live view through the inputter 130, the controller 150 may control the display 120 to change the view point of the image and display the changed image in live view. For example, assuming that the subject is a person and the display 120 is displaying the front of the person in live view, when a user command is input to change the view point for the person to the left, the controller 150 controls the display 120 to display an image captured on the right of the person.

In particular, when the inputter 130 is implemented with a touch panel, the controller 150 may change the view point of the image according to a touch and drag user command input through the inputter 130. However, a user command to change the view point of the image is not limited to a touch and drag user command, and may be another command or gesture, such as for example, a user command by rotating the image photographing apparatus 100.

When a plurality of images having different view points input through the image inputter 110 are stored in the storage 140, and when a user command is input to display a representative image among the plurality of images through the inputter 130, the controller 150 may control the display 120 to display the representative image. In addition, when a user command is input to change the view point of the displayed representative image, the controller 150 may control the display 120 to display one of at least one supplementary image having a view point which is different from that of the representative image according to the user command.

Using the image photographing apparatus 100 as described above, the user may acquire an optimally photographed image among the plurality of images having different view points for the same subject.

Figure 2:
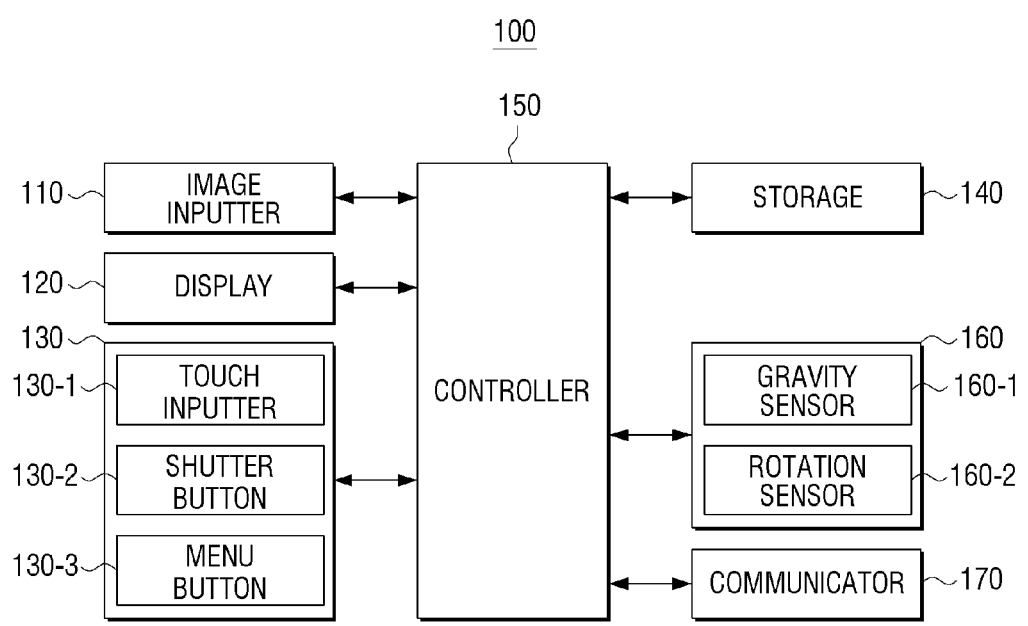
FIG. 2 is a detailed block diagram of a configuration of an image photographing apparatus according to another exemplary embodiment.

FIG. 2 is a detailed block diagram of a configuration of the image photographing apparatus according to another exemplary embodiment. The image photographing apparatus 100 shown in FIG. 2 may include an image inputter 110, a display 120, an inputter 130, a storage 140, a controller 150, a sensor 160, and a communicator 170.

In FIG. 2, the components of the image photographing apparatus 100 having diverse functions such as communications, video playback, display, and change of a photographing view point are shown as an example. Therefore, according to exemplary embodiments, a portion of the components shown in FIG. 2 may be omitted or changed, or other components may be added.

The image inputter 110 may include a lens (not shown). The lens (not shown) receives light from a subject, and one or more lenses may be provided. When a single lens is provided, the image inputter 110 may input a plurality of images photographed at different view points for the same subject using a sensor capable of receiving a plurality of images. For example, the sensor capable of receiving a plurality of images may be implemented with one of a time of flight sensor, a micro lens array, and/or a device capable of light field capture, etc. The time of flight sensor may input a plurality of images for the subject by immediately measuring a real-time distance to the subject and thereby knowing depth information for the subject, or by ignoring an amount of light reflected from the subject and considering only a time taken for the light to come back. The micro lens array may input a plurality of images for the subject by arranging a micro-sized lens having a diameter of about 0.1 mm to about 5 mm on average in every single sensor. The device capable of light field capture may input a plurality of images photographed at different view points for the subject by using a method of forming the entire image using a lens and a filter.

When a plurality of lenses (not shown) are provided, each lens (not shown) may receive light and the image inputter 110 may input a plurality of images having different view points for the subject.

The display 120 displays an image input through the image inputter 110. The display 120 may display a currently input image in live view, display an image acquired according to the user's photographing command, or display an image received from a storage device, a user terminal, or a cloud system through the communicator 170.

When the display 120 displays a first image among a plurality of images having different view points, and when a preset user command is input through the inputter 130, the display 120 may display one of at least one image input at view points which are different from those of the first image according to the input preset user command.

For example, when a user command input method is a touch method, and when a user command to touch and drag on the display 120, on which the first image is displayed, in predetermined direction is input to the inputter 130, the display 120 may display an image having a view point which is different from that of the first image. More specifically, supposing that the subject is a person's face, and the first image acquired at a reference view point is the front of the person's face. When a user command to touch and drag on the display 120 from right to left is input to the inputter 130, the display 120 may display images acquired by moving a view point to watch the person's face from the front of the face to the right.

In addition, the display 120 may move a view point of the image according to the intensity of the user command to touch and drag the inputter 130. For example, when the display 120 is displaying a first image acquired by photographing the front of the person, and when a user touch and drag command is input to the inputter 130 at preset first intensity, the display 120 may display an image on which the front of the person of the first image is rotated at 5° to the right. In addition, when a user command is input an integer multiple times more intensely (for example, 10 times) than the preset first intensity, the display 120 may display an image captured at a view point which is moved from the front of the face to the right as much as the integer multiple times 5° (for example, 50°). At this time, when a touch command is input through the inputter 130 at the intensity as much as an integer multiple times of the preset first intensity, the display 120 may display from the first image acquired at the reference view point to images having a plurality of different view points sequentially, and the view point may rotate to correspond to the preset integer multiple times of 5°.

In this exemplary embodiment, the user command input method is a touch method, but this is merely an example. The user command input method may be, for example, voice, and/or a rotation or inclination of the image photographing apparatus 100.

In addition, the display 120 may display a view point indicating UI to show the user a view point at which an image is captured. The view point indicating UI may include an indicator to represent the photographing view point. For example, the indicator may be formed in a circle shape. In a large circle, a small circle with different color may be displayed. When the display 120 displays an image captured at the reference view point, the small circle is located at the center of the large circle, and when a user command is input to change the photographing view point, the position of the small circle within the large circle may change according to the change of the photographing view point.

A case in which a subject is a person's face, an input first image is the front of the person's face, and a user command input method is a touch method is described. When the display 120 is displaying the first image input through the image inputter 110 and a user command is input to the inputter 130 to touch and drag in a predetermined direction, the display 120 displays an image having a photographing view point which is different from that of the first image, and displays the indicator in which the position of the small circle with different color is changed within the large circle according to the changed degree of the photographing view point.

For example, suppose that the subject is a person's face and the input first image is the front of the person's face, which serves as a reference view point. When a touch and drag command on the display 120 from right to left is input to the inputter 130, the display 120 displays images acquired by moving a view point to watch the person's face from the front of the face to the right, and displays the indicator in which the small circle at the center of the large circle moves in the left horizontal direction.

In another exemplary embodiment, the indicator may be formed in an arrow shape. More specifically, when the display 120 displays an image captured at the reference view point, the indicator of the arrow shape is displayed in a shape headed from the rear to the front. When a user command is input through the inputter 130 to change the photographing view point, the display 120 may display the arrow headed in a different direction according to the change of the view point. In other words, the display 120 may display the arrow to correspond to a view point of the image photographing apparatus 100 to photograph the subject.

The inputter 130 may include a touch inputter 130-1, a shutter button 130-2, and a menu button 130-3. However, according to features of the image photographing apparatus 100, a portion of the touch inputter 130-1, the shutter button 130-2, and the menu button 130-3 may be deleted and other components may be added.

The touch inputter 130-1 may input a user command to change a currently displayed image to an image having a view point which is different from that of the currently displayed image. For example, the touch inputter 130-1 may change the view point of the currently displayed image according to a touch and drag. The touch inputter 130-1 may be provided in the display 120.

The shutter button 130-2 may input a user command to take a photograph. The shutter button 130-2 may input one of a half-shutter command and a full shutter command.

The menu button 130-3 may input a user command to display a menu to control the image photographing apparatus 100. The menu displayed by the menu button 130-3 may include an item to change an image to display on the display 120 from live view to an image stored in the storage 140, an item to change photo shooting to video shooting, and an item to delete an image from the storage 140, but these are merely an example, and other exemplary embodiment may include more or fewer menu items. That is, the menu may include diverse items to control the image photographing apparatus 100 and help the user's convenience.

The storage 140 stores an image input through the image inputter 110, an image acquired according to a photographing command, and diverse modules to drive the image photographing apparatus 100. In particular, when the image inputter 110 inputs a plurality of images having different view points for a subject, the storage 140 may store some or all of the plurality of input images. When a user command to designate a representative image among the plurality of images input through the image inputter 110 is input to the inputter 130, the storage 140 may store the designated representative image and delete supplementary images. Alternatively, the storage 140 may store only the designated representative image and delete the supplementary images.

In addition, the storage 140 may store software including a base module, a sensing module, a communication module, a presentation module, a web browser module, and a service module. The base module is a basic module which processes a signal transmitted from hardware included in the image photographing apparatus 100 and transmits the signal to an upper layer module. The sensing module is a module which collects information from diverse sensors and analyzes and manages the collected information, and may include a face recognition module, a voice recognition module, a motion recognition module, and/or a near field communications (NFC) recognition module, etc. The presentation module is a module which constitutes a display screen, and may include a multimedia module to play back and output multimedia content and a user interface (UI) rendering module to process UI and graphic. The communication module is a module which externally performs communication. The web browser module is a module which performs web browsing and accesses a web server. The service module is a module which includes diverse applications to provide diverse services.

As described above, the storage 140 may include diverse program modules, but according to the type and features of the image photographing apparatus 100, a portion of program modules may be deleted or changed and other program modules may be added.

In order to sense the movement of the image photographing apparatus 100, the sensor 160 may include a gravity sensor 160-1 and a rotation sensor 160-2 as shown in FIG. 2. In particular, the sensor 160 senses a rotated or inclined degree of the image photographing apparatus 100, and the controller 150 may control the display 120 to change an image to display according to the sensed degree from the gravity sensor 160-1 and/or the rotation sensor 160-2. However, in order to sense the movement of the image photographing apparatus 100, other sensors (for example, an acceleration sensor) may be provided instead of the gravity sensor 160-1 and/or the rotation sensor 160-2

The communicator 170 communicates with diverse types of external devices according to diverse types of communication methods. In particular, when an image captured by the image photographing apparatus 100 is stored in an external storage device or using a cloud service, the communicator 170 may communicate with the external storage device or the cloud system. In addition, when a user command to control the image photographing apparatus 100 is input from an external device or when an external device displays an image on the display 120 of the image photographing apparatus 100, the communicator 170 may communicate with the external devices.

More specifically, the communicator 170 may transmit a plurality of images having different view points input by the image photographing apparatus 100 to an external device. In addition, when a user command to change a first image to a second image having a view point which is different from that of the first image is input from the external device, the communicator 170 may receive the user command. In addition, when a photographing command to acquire an image displayed on the display 120 in live view is input from the external device, the communicator 170 may receive the photographing command.

The communicator 170 may include diverse communication chips such as, for example, a Wi-Fi chip, a Bluetooth chip, a near field communication (NFC) chip, and/or wireless communication chip. The Wi-Fi chip, the Bluetooth chip, and the NFC chip perform communication according to a Wi-Fi method, a Bluetooth method, and a NFC method, respectively. The NFC chip is a chip which operates in the NFC method using the 13.56 MHz band among diverse radio frequency identification (RFID) frequency bands such as 135 kHz, 13.56 MHz, 433 MHz, 860-960 MHz, and 2.45 GHz. Using the Wi-Fi chip or the Bluetooth chip, diverse connection information such as a subsystem identification (SSID) and a session key are transmitted and received first, and then when communication is connected, diverse information can be transmitted and received. The wireless communication chip is a chip which performs communication according to diverse communication standards such as, for example, IEEE, Zigbee, $3^{rd}$ generation (3G), $3^{rd}$ generation partnership project (3GPP), and/or long term evolution (LTE).

The controller 150 controls the overall operations of the image photographing apparatus 100 according to a user command input through the inputter 130 or according to rotation or movement sensed by the sensor 160.

More specifically, when a user command to acquire an image is input, the controller 150 controls the image inputter 110 to input an image for a subject. In particular, the controller 150 may control the image inputter 110 to input a plurality of images having different view points for the subject. For example, when the subject is a person, the controller 150 may control the image inputter 110 to acquire an image captured at the front of the person as a representative image and to acquire supplementary images photographed at different view points in multiple directions such as, for example, upper, lower, left and right directions in relation to the front of the person. The changed degree of the photographing view point may vary according to types of a lens or a photographing sensor included in the image inputter 110, or according to a user command.

In addition, the controller 150 may control the display 120 to display an image input to the image inputter 110 in live view or to display an image stored in the storage 140. In other words, when the display 120 is displaying the input image in live view and when a user command is input to change the view point, the controller 150 may control the display 120 to display an image for the subject input at the changed view point in live view. In addition, when the controller 150 is controlling the display 120 to display an image stored in the storage 140 and when a user command is input to change the photographing view point, the controller 150 controls the display 120 to display an image acquired at the changed view point for the subject.

More specifically, when the display 120 is displaying an image input by the image inputter 110 in live view and when a user command is input to change a view point of the image through the inputter 130, the controller 150 may control the image inputter 110 to change the view point of the input image and control the display 120 to display the changed image in live view.

Figure 3A:
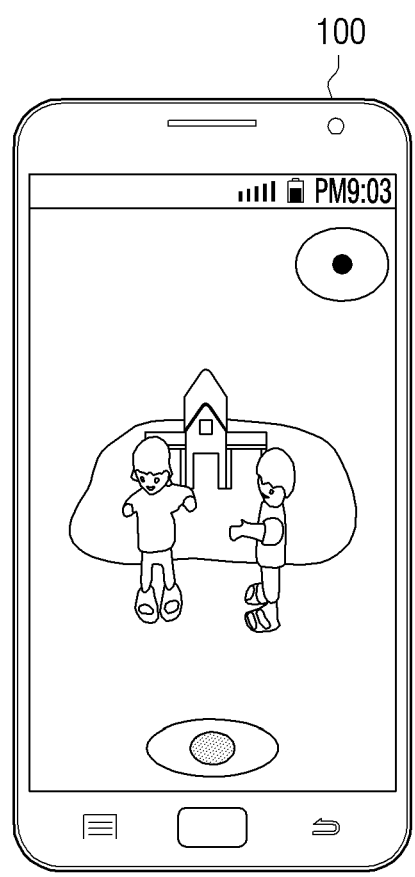
FIGS. 3A to 4C show examples of screens on which a subject is input according to different view points of the image photographing apparatus.

For example, assume that the subject is a person and a house which is a background, and the display 120 is displaying the front of the person and the house in live view as shown in FIG. 3A. When a user command is input to change the photographing view point through the inputter 130, the controller 150 may control the display 120 to display an image of the same person but captured at a different view point. See, for example, FIG. 3B, which will be described further below.

The controller 150 may control the display 120 to display a view point indicating UI to show the user a view point at which an image is captured.

The view point indicating UI may include an indicator to represent the photographing view point. The indicator represents the photographing view point at which the subject is watched. In other words, the indicator may represent the changed degree of the photographing view point from the reference view point.

The indicator may be formed in a circle shape as shown in FIG. 3A. In a large circle, a small circle with different color may be displayed. In particular, when the display 120 displays an image input at a view point as a representative image, the controller 150 may control the display 120 to locate the small circle at the center of the large circle. The viewpoint may be predetermined. In addition, when a user command is input to change the photographing view point, the controller 150 may control the display 120 to change the position of the small circle in the large circle according to change of the view point.

Figure 3B:
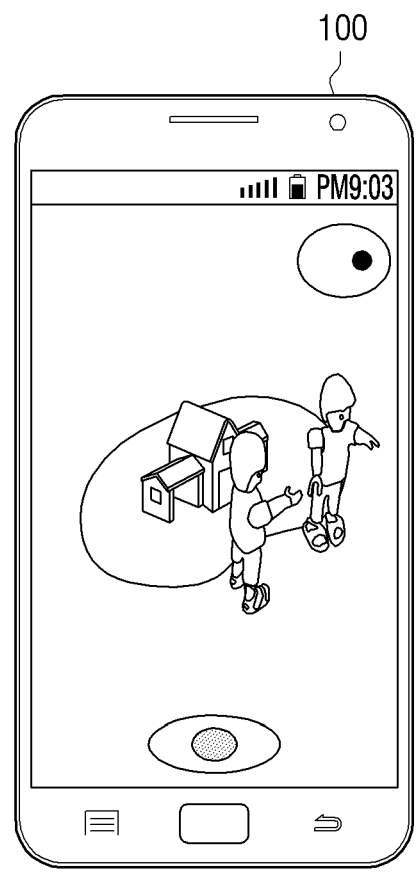

FIG. 3B shows the image photographing apparatus 100 displaying an image which is input at a photographing view point moved 45° to the left from the photographing view point shown in FIG. 3A according to an exemplary embodiment.

In other words, FIG. 3B shows the image photographing apparatus 100 of when a user command to display an image which is input at a view point moved to the left from the photographing view point shown in FIG. 3A is input to the inputter 130.

For example, suppose that a user command is input through the touch inputter 130-1. When the image of FIG. 3A is shown and a user command is input using the touch inputter 130-1 to touch and drag from left to right, the display 120 displays an image input at a view point moved to the left as shown in FIG. 3B. In addition, the display 120 may display an image input at the view point shown in FIG. 3A, and then display an image input at a view point moved 45° to the left according to a user command to change to the view point as shown in FIG. 3B. At this time, the controller 150 may control the display 120 to display a plurality of images which are input from the image input at the view point shown in FIG. 3A to the image input at the view point moved 45° to the left as shown in FIG. 3B. In other words, the controller 150 may control the display 120 to display a plurality of sequential images that show the scene being gradually changed from the view point of FIG. 3A to the view point of FIG. 3B. In addition, the controller 150 may control the display 120 to change the number of a plurality of displayed images and the speed to display the plurality of displayed images according to the intensity and speed of the user command to touch and drag input using the touch inputter 130-1. In other words, when a user command is input using the touch inputter 130-1 to touch and drag fast and strongly, the controller 150 may control the display 120 to display an image input at the view point shown in FIG. 3A, and then to display an image input at the view point moved 45° to the left as shown in FIG. 3B without displaying an image input at an intermediate view point. Alternatively, the controller 150 may control the display 120 to display an image input at the view point shown in FIG. 3A, and then a fast progression of a plurality of images input at intermediate view points, and finally to display an image input at the view point moved 45° to the left as shown in FIG. 3B. When a user command is input using the touch inputter 130-1 to touch and drag relatively slowly and weakly, the controller 150 may control the display 120 to display an image input at the view point shown in FIG. 3A, and then to display a slow progression of images input at view points moved a predetermined angle between 0° and 45° to the left.

When the display 120 displays images input at a plurality of different view points, the controller 150 may control the display 120 to display the indicator to correspond to the change of the view point. In other words, suppose that the indicator has a circle shape including a small circle in a large circle as shown in FIG. 3A, and a user command is input through the touch inputter 130-1. When a user command is input using the touch inputter 130-1 to touch and drag from left to right, the small circle may move in the large circle in the right horizontal direction to end up as shown in FIG. 3B.

That is, when the display 120 displays an image input at a view point moved 45° to the left (as shown in FIG. 3B) from a reference view point (as shown in FIG. 3A) according to a user command, the indicator may display the small circle at the center of the large circle (as shown in FIG. 3A) to be moved half of the radius of the large circle in the right horizontal direction (as shown in FIG. 3B).

When the controller 150 controls the display 120 to display a plurality of input images from the image input at the photographing view point shown in FIG. 3A to the image input at the view point moved 45° to the left as shown in FIG. 3B, the display 120 may display the small circle in the large circle to be moved according to a photographing view point of each image.

Figure 3C:
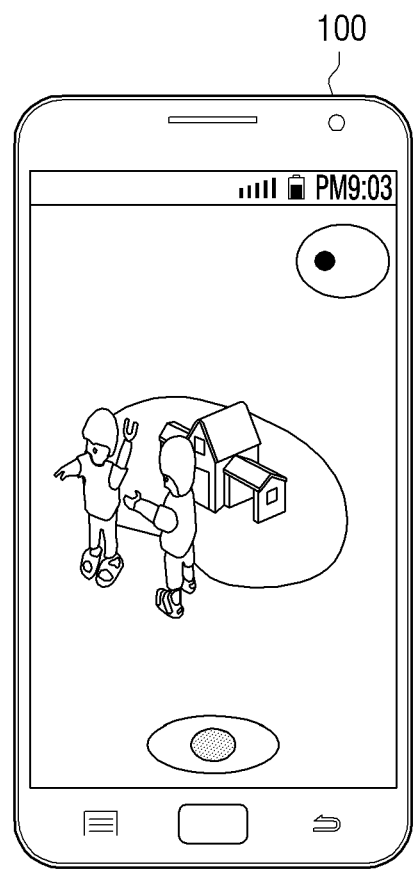

FIG. 3C shows the image photographing apparatus 100 displaying an image which is input at a photographing view point moved 45° to the right from the photographing view point shown in FIG. 3A according to an exemplary embodiment.

In other words, FIG. 3C shows the image photographing apparatus 100 when a user command to display an image which is input at a view point moved to the right from the photographing view point shown in FIG. 3A is input to the inputter 130.

For example, suppose that a user command is input through the touch inputter 130-1. When a user command is input using the touch inputter 130-1 to touch and drag from right to left, the display 120 displays an image input at a view point to the left as shown in FIG. 3C. In addition, the display 120 may display an image input at the view point shown in FIG. 3A, and then display an image input at a view point moved 45° to the right according to a user command to change the view point as shown in FIG. 3C. At this time, the controller 150 may control the display 120 to display a plurality of images which are input from the image input at the view point shown in FIG. 3A to the image input at the view point moved 45° to the right as shown in FIG. 3C. In addition, the controller 150 may control the display 120 to change the number of the plurality of displayed images and/or the speed of displaying the plurality of displayed images according to the intensity and speed of the user command input using the touch inputter 130-1 to touch and drag. In other words, when a user command is input using the touch inputter 130-1 to touch and drag fast and strongly, the controller 150 may control the display 120 to display an image input at the view point shown in FIG. 3A, and to display an image input at the view point moved 45° to the right as shown in FIG. 3C, without displaying an image input at an intermediate view point. Alternatively, the controller 150 may control the display 120 to display a plurality of images input at intermediate view points in fast succession ending up at an image input at the view point moved 45° to the right as shown in FIG. 3C. When a user command is input using the touch inputter 130-1 to touch and drag relatively slowly and weakly, the controller 150 may control the display 120 to display the image input at the view point shown in FIG. 3A, and then to display a slow succession of images input at view points moved through predetermined angles between 0° and 45° to the right with respect to the reference image shown in FIG. 3A.

When the display 120 displays images input at a plurality of different view points, the controller 150 may control the display 120 to display the indicator to correspond to the change of the view point. In other words, suppose that the indicator has a circle shape including a small circle in a large circle as shown in FIG. 3A, and a user command is input through the touch inputter 130-1. When a user command is input using the touch inputter 130-1 to touch and drag from right to left, the small circle may move in the large circle in the left horizontal direction to a position as shown in FIG. 3C.

That is, when the display 120 displays an image input at a view point moved 45° to the right (as shown in FIG. 3C) from a reference view point (as shown in FIG. 3A) according to a user command, the indicator may display the small circle at the center of the large circle (as shown in FIG. 3A) and move the indicator half of the radius of the large circle in the left horizontal direction as shown in FIG. 3C.

When the controller 150 controls the display 120 to display a plurality of input images from the image input at the photographing view point shown in FIG. 3A to the image input at the view point moved 45° to the right as shown in FIG. 3C, the display 120 may display the small circle in the large circle to be moved according to a photographing view point of each image.

Figure 4A:
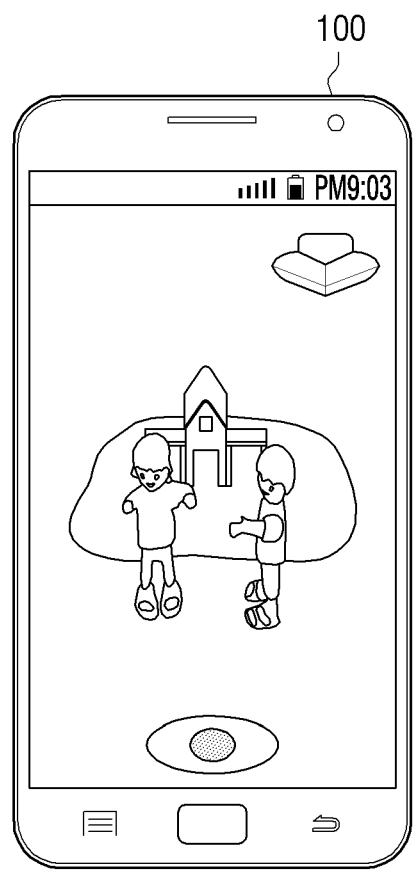
Figure 4B:
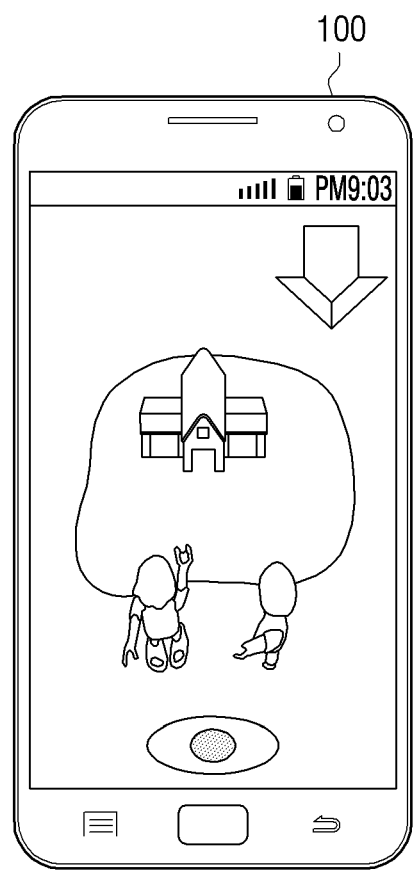
Figure 4C:
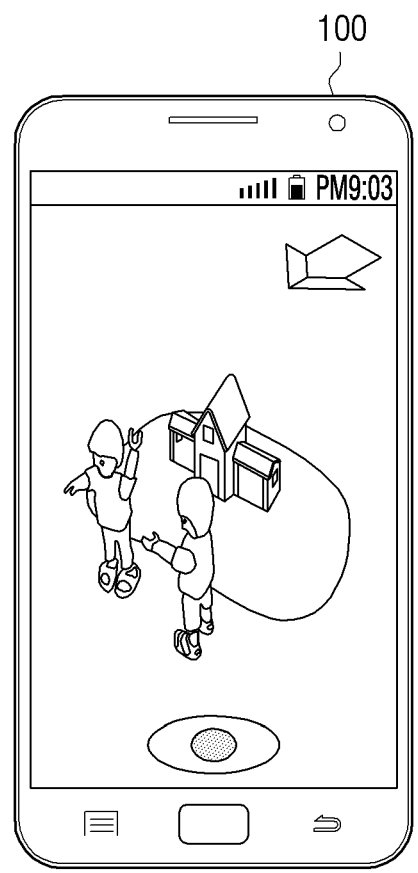

FIGS. 4A to 4C show screens of the image photographing apparatus 100 on which a subject is input at different view points according to another exemplary embodiment. In particular, FIGS. 4A to 4C show an exemplary embodiment in which an indicator of a view point indicating UI has an arrow shape.

In FIG. 4A, an image input at a frontal view point is displayed on the display 120. The indicator of the arrow shape may be displayed in a shape headed from the rear to the front in order to represent the fact that the image is displayed at the frontal view point. The controller 150 controls the display 120 to display a direction indicated by the indicator according to a user command to change a view point to input an image.

In FIG. 4B, the display 120 displays an image input at a view point moved 90° upwards from the photographing view point shown in FIG. 4A. A user command to change the photographing view point may be input by touch, but this is merely an example. The input method may be voice recognition, or rotation and/or inclination of the image photographing apparatus 100.

As illustrated in FIG. 4A to FIG. 4C, for example, when the image photographing apparatus 100 is a smart phone and when the gravity sensor 160-1 senses movement of the smart phone by repeatedly inputting a user command to move an upper portion of the smart phone in a direction against gravity, the controller 150 may control the display 120 to display an image input at a view point moved 90° upwards from the photographing view point as shown in FIG. 4B.

The display 120 may display an image captured at a view point moved 90° upwards from the photographing view point as shown in FIG. 4B.

In addition, the indicator of the arrow shape may be displayed in a shape headed downwards as shown in FIG. 4B. In other words, since a photographing view point to watch the subject is headed downwards, the controller 150 may control the display 120 to display the indicator to correspond to the photographing view point.

In FIG. 4C, the display 120 displays an image input at a view point moved 45° to the right and 45° upwards from the photographing view point shown in FIG. 4A. As described above with reference to FIG. 4B, when the image photographing apparatus 100 is a smart phone and when the gravity sensor 160-1 senses movement of the smart phone by repeatedly inputting a user command to move an upper portion of the smart phone in a direction against gravity and a user command to move a right portion of the smart phone in a direction against gravity, the controller 150 may control the display 120 to display an image input at a view point moved 45° upwards and 45° to the right from the reference view point as shown in FIG. 4C.

In addition, the indicator of the arrow shape may be displayed in a shape such that the body of the arrow is elongated and viewed from the top in order to illustrate the 90° upwards view point (as shown in FIG. 4B) from the photographing view point shown in FIG. 4A. With respect to FIG. 4C, the indicator of the arrow shape may be displayed in a shape headed in a 7 o'clock direction as shown in FIG. 4C. In other words, since a photographing view point to watch the subject is moved 45° upwards and 45° to the right from the photographing view point shown in FIG. 4A and thereby heads in a 7 o'clock direction, the indicator may be displayed to correspond to the moved view point.

FIG. 5 is a flowchart showing an example of a photographing method of the image photographing apparatus 100 according to an exemplary embodiment.

Turning to FIG. 5, the image photographing apparatus 100 inputs a plurality of images having different view points for a subject (S510). The image photographing apparatus 100 may input a plurality of images having different view points using a plurality of lenses or using a single lens and a sensor such as a time of flight sensor and a light field sensor.

Subsequently, the display 120 displays a first image among the plurality of images (S515). The first image may be an image input at any photographing view point of the view points. That is, the first image may be any of the plurality of images. The photographing view point may be preset, or when the image photographing apparatus 100 includes a plurality of lenses, the photographing view point may be a view point shown by a particular lens. The particular lens may be preset, for example, as a central lens.

The display 120 changes the first image to a second image having a different view point and displays the second image in response to a command (S520). The display 120 may change the first image to the second image according to a user command. The user command may be input by touch input, voice recognition, and/or inclination of the image photographing apparatus 100. The changed degree of the view point may depend on the number, intensity, and/or speed of user commands. For example, when a user command is input by touch strongly and fast, the changed degree of the view point may be large.

It is determined whether a photographing command is input (S525). When a photographing command is input through the inputter 130 (S525—Y), the image photographing apparatus 100 acquires a second image (S530). The display 120 displays the second image input at a changed view point, and the photographing command may be input through the inputter 130. The photographing command may be input by pressing the shutter button 230-2.

When a photographing command is not input (S525—N), the display 110 displays the second image input by the image inputter 120. When a photographing command is not input for a period of time, the image photographing apparatus 100 may enter a sleep mode or be turned off. The period of time may be predetermined.

The image photographing apparatus 100 may display a view point indicating UI to indicate a view point at which an image is captured. The view point indicating UI may include an indicator to represent the photographing view point. In addition, at least one of shapes of the indicator may change according to the change of the photographing view point. Since the exemplary embodiments regarding the view point indicating UI have been described above in detail, illustration and description of their flowcharts are omitted here.

Figure 6:
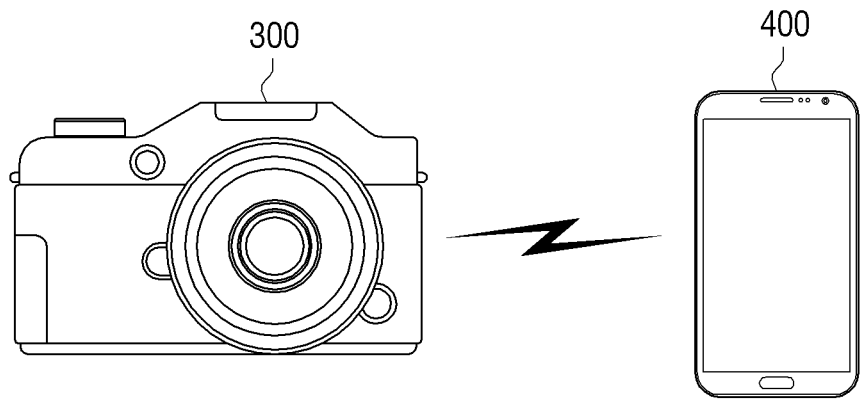
FIG. 6 shows an example of communication between an image photographing apparatus and an external device according to an exemplary embodiment.

FIG. 6 shows communication between an image photographing apparatus and an external device according to an exemplary embodiment. That is, the communicator 170 of the image photographing apparatus 100 communicates with the external device, and the external device may control the image photographing apparatus 100.

More specifically, when the external device is a smart phone 400, and the image photographing apparatus 100 is a camera 300 as shown in FIG. 6, the communicator 170 of the image photographing apparatus 100 (i.e., the camera 300) may transmit a live view image to the smart phone 400, and the live view image is displayed on the display of the smart phone 400. When the live view is received by the smart phone 400 and is displayed on a display (not shown) of the smart phone 400, a user command to change a photographing view point may be input to the smart phone 400. In other words, when a user command input method is a touch method, a user command is input to the display (not shown) of the smart phone 400 to touch and drag so that the photographing view point may be changed. When a user command input method is voice, a voice input such as "left", "right", "up" or "down" may be input to change the photographing view point.

When a user command to change the photographing view point is input to the smart phone 400, a communicator (not shown) of the smart phone 400 may transmit the input user command to the camera 300. The communicator 170 of the camera 300 receives the user command, and the controller 150 controls the display 120 of the camera 300 to change and display the photographing view point to correspond to the received user command.

A photographing command may be input to a photographing unit (not shown) of the smart phone 400, and the communicator 170 of the camera 300 may receive the photographing command from the smart phone 400 so that an image displayed on the display 120 of the camera 300 may be captured.

Using the image photographing method as described above, when the user becomes a subject and is photographed from a long distance, the user may take photographs by identifying a photographing view point and a composition using a smart phone in real time and changing the photographing view point. In addition, the user may change the photographing view point with simple manipulation such as touch without changing the user's position or the position of the image photographing apparatus 100. That is, for example, if a user sets up a camera 300 having, for example, a micro lens array, a plurality of lenses, a sensor capable of receiving a plurality of images, a time of flight sensor, or a light field capture capability, across a room so as to photograph the user as a subject, the user may use a smart phone 400 to control the camera 300 to change and select among different view points.

FIG. 7 is a sequence diagram showing the photographing method of the image photographing apparatus according to an exemplary embodiment.

A camera 300 which is an example of the image photographing apparatus 100 inputs a plurality of images having different view points for a subject (S710), and transmits the plurality of input images to a smart phone 400 which is an example of the external device. Subsequently, the camera 300 and the smart phone 400 display a first image among the plurality of images (S720-1, S720-2). When a user command to change a photographing view point is input to the smart phone 400 (S725), the smart phone 400 transmits the user command to the camera 300 (S730). According to the user command, the camera 300 and the smart phone 400 change the first image displayed on the display 120 to a second image (S735-1, S735-2). When a photographing command is input (S740), the smart phone 400 transmits the photographing command to the camera 300 (S745). The camera 300 acquires the second image (S750) according to the photographing command, and the camera 300 and the smart phone 400 display the acquired second image (S755-1, S755-2).

Figure 8A:
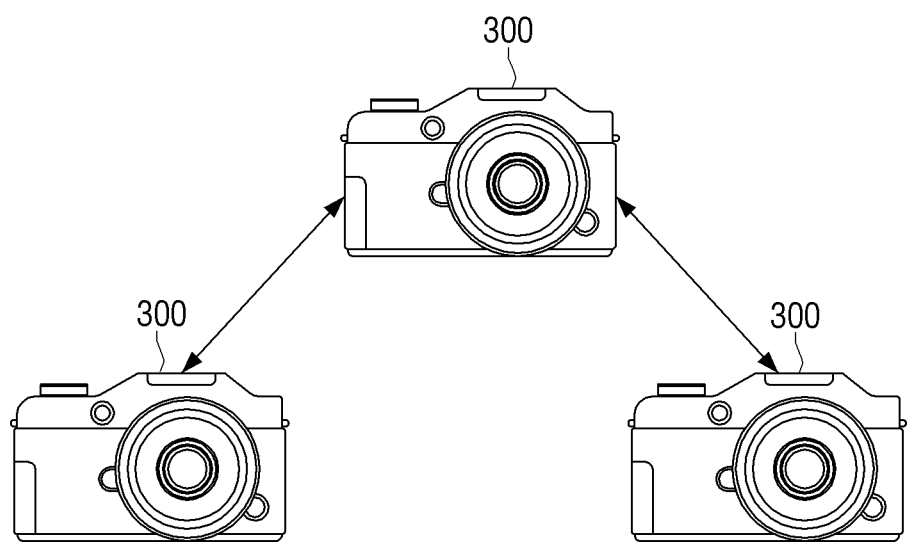
FIGS. 8A and 8B show an example of a case of controlling view points of a plurality of cameras according to an exemplary embodiment.
Figure 8B:
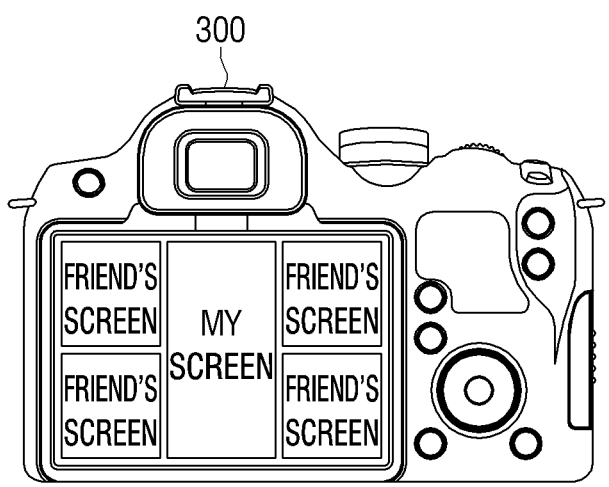

FIGS. 8A and 8B show an example of a case of controlling view points of a plurality of cameras according to an exemplary embodiment.

A plurality of image photographing apparatuses 100 may communicate with each other using their respective communicators 170. In other words, images input through each inputter 110 and images stored in each storage 140 may be transmitted or received among the plurality of image photographing apparatuses 100. In FIG. 8A, three cameras 300 are shown. However, the number of image photographing apparatuses 100 (e.g., cameras 300) is not particularly limited, and two or more image photographing apparatuses 100 (e.g., cameras 300) may communicate with one another. Moreover, although cameras are shown in FIG. 8A, the image photographing apparatuses 100 may be diverse devices having the image inputter 110, such as, for example, smart phones and tablet PCs instead of or as well as cameras. In addition, a portion of the image photographing apparatuses 100 may be cameras, and others may be smart phones or tablet PCs. Accordingly, communication is also enabled among different kinds of image photographing apparatuses 100.

As shown in FIG. 8B, the display 120 of the image photographing apparatus 100 (e.g., the camera 300) may display images input by other image photographing apparatuses 100 concurrently, and a user command to change a photographing view point may be input to each image. Alternatively, the display 120 may display images stored in storages 140 of other image photographing apparatuses 100, and a user command to change a photographing view point that the user wants may be input to each stored image. When three or more image photographing apparatuses 100 communicate with one another, a portion of the image photographing apparatuses 100 may display a stored image, and a portion of the image photographing apparatuses 100 may display a live view image.

Figure 9:
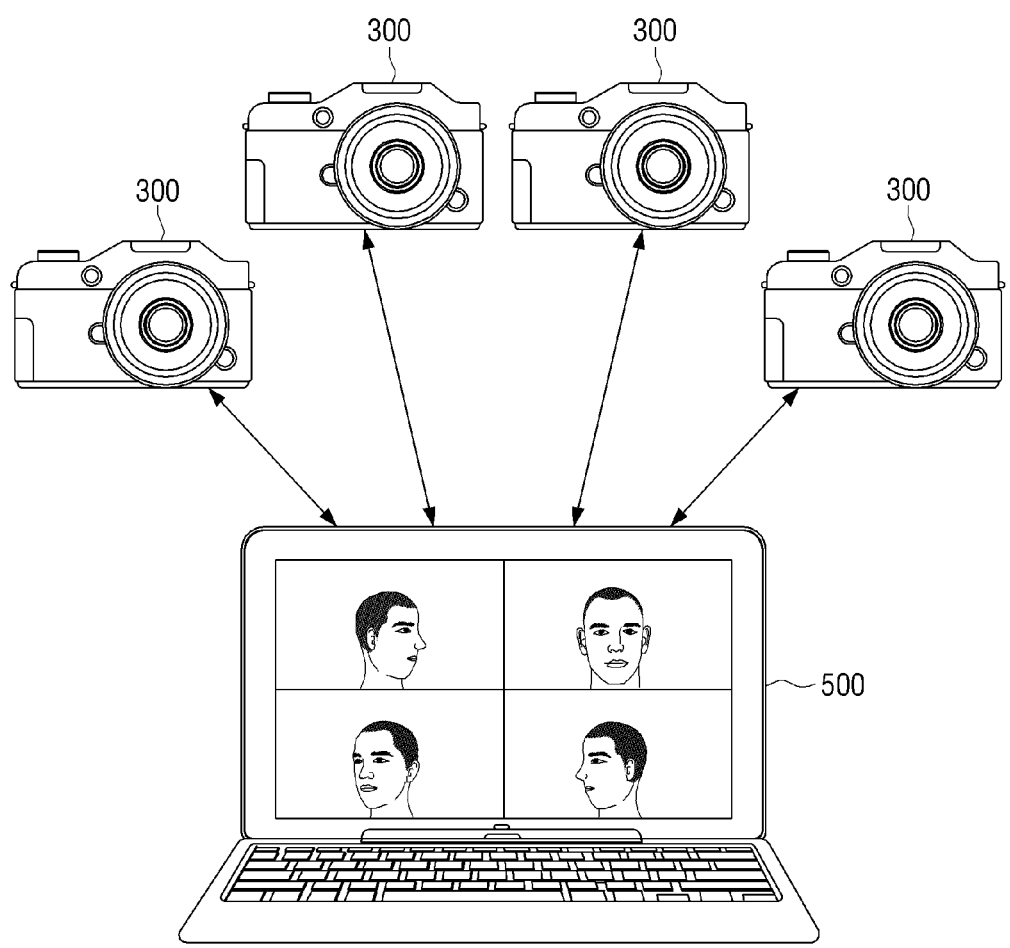
FIG. 9 shows an example of a case of controlling view points of a plurality of cameras using an external device according to an exemplary embodiment.

FIG. 9 shows an example of a case of controlling view points of a plurality of cameras using an external device according to an exemplary embodiment.

As shown in FIG. 9, a plurality of image photographing apparatuses 100 (e.g., cameras 300) may communicate with an external device (e.g., a PC 500) using their respective communicators 170. Accordingly, when the communicator 170 of each image photographing apparatus 100 (e.g., the camera 300) transmits an image input by the image inputter 110 to the external device (e.g., the PC 500), the external device (e.g., the PC 500) may display each image at the same time. When a user command to change a viewing point of each image is input to the external device (e.g., the PC 500), the external device (e.g., the PC 500) may control photographing viewing points of the image photographing apparatuses 100 (e.g., the cameras 300).

Furthermore, when a photographing command for each image photographing apparatus 100 (e.g., the camera 300) is input to the external device (e.g., the PC 500) at the same time or at different times, the external device (e.g., the PC 500) may control acquisition of an image of each image photographing apparatus 100 (e.g., the camera 300).

The foregoing exemplary embodiments and advantages are merely exemplary and are not to be construed as limiting the present inventive concept. The present inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image photographing method of an image photographing apparatus, the image photographing method comprising:
    inputting a plurality of images having different view points for a subject;
    displaying a first image among the plurality of images;
    displaying a view point indicating user interface (UI) that indicates a view point at which the first image is captured;
    in response to an input of a user command, changing the first image to a second image having a view point which is different from that of the first image, and displaying the second image; and
    in response to an input of a photographing command, acquiring the second image.

2. The image photographing method as claimed in claim 1, wherein the acquiring the second image comprises storing the second image as a representative image, and storing the remaining images among the plurality of images except for the second image as supplementary images.

3. The image photographing method as claimed in claim 2, further comprising:
    in response to an input of another user command while the representative image is displayed, displaying one of the supplementary images according to the another user command; and
    in response to an input of a storing command, storing the displayed one of the supplementary images as a new representative image.

4. The image photographing method as claimed in claim 1, wherein the first image is an image of a front of the subject, and
    when the user command is a touch input dragging to the left, the second image is an image of the subject photographed from the right, and when the user command is a touch input dragging to the right, the second image is an image of the subject photographed from the left.

5. The image photographing method as claimed in claim 1, wherein the displaying the second image comprises displaying a view point indicating UI that indicates a view point at which the second image is captured.

6. The image photographing method as claimed in claim 5, wherein the view point indicating UI includes an indicator that represents a photographing view point, and the indicator changes at least one of position and shape according to the user command.

7. The image photographing method as claimed in claim 1, further comprising:
    transmitting the plurality of input images to an external device,
    wherein the input of the user command comprises:
    receiving the user command to change the first image to the second image from the external device.

8. The image photographing method as claimed in claim 7, wherein the input of the photographing command comprises receiving the photographing command from the external device.

9. The image photographing method as claimed in claim 7, wherein in response to the external device receiving the plurality of images from the image photographing apparatus, the external device displays the first image, and
    in response to receiving a command input to the external device for changing the first image, the external device changes the first image to the second image and displays the second image on the external device, and transmits the command to the image photographing apparatus as the user command.

10. The image photographing method as claimed in claim 1, wherein inputting the plurality of images comprises inputting the plurality of images through a plurality of lenses.

11. An image photographing method of an image photographing apparatus, the method comprising:
    inputting a plurality of images having different view points for a subject;
    displaying a first image among the plurality of images and a view point indicating user interface (UI) that indicates a view point at which the first image is captured; and
    in response to an input of a user command, changing the first image to a second image having a view point which is different from that of the first image and displaying the second image.

12. An image photographing apparatus comprising:
    an image inputter configured to input a plurality of images having different view points for a subject;
    a display configured to display a first image among the plurality of images input by the image inputter and display a view point indicating user interface (UI) that indicates a view point at which the first image is captured;
    an inputter configured to input a user command; and
    a controller configured to, in response to a user command, change the first image to a second image having a view point which is different from that of the first image and control the display to display the second image, and, in response to a photographing command, acquire the second image.

13. The image photographing apparatus as claimed in claim 12, further comprising a storage,
    wherein, in response to the photographing command, the controller stores the second image as a representative image in the storage, and stores the remaining images among the plurality of images except for the second image as supplementary images in the storage.

14. The image photographing apparatus as claimed in claim 13, wherein, in response to another user command being input while the representative image is displayed, the controller controls the display to display one of the supplementary images according to the another user command; and
    in response to a storing command being input, the controller stores in the storage the one of the supplementary images as a new representative image.

15. The image photographing apparatus as claimed in claim 12, wherein the first image is an image of a front of the subject, and when the user command is a touch input dragging to the left input through the inputter, the second image is an image of the subject photographed from the right, and when the user command is a touch input dragging to the right input through the inputter, the second image is an image of the subject photographed from the left.

16. The image photographing apparatus as claimed in claim 12, wherein the view point indicating UI comprises an indicator that represents a photographing view point, and the indicator changes at least one of position and shape according to the user command.

17. The image photographing apparatus as claimed in claim 12, further comprising:

a communicator configured to transmit the plurality of input images to an external device, wherein the controller controls the communicator to receive the user command from the external device, and changes an image to display from the first image to the second image according to the received user command.

18. The image photographing apparatus as claimed in claim 17, wherein the controller receives the photographing command from the external device, and in response to the received photographing command, acquires the second image.

19. The image photographing apparatus as claimed in claim 17, wherein in response to receiving the plurality of images from the image photographing apparatus, the external device displays the first image, and in response to receiving a command input to the external device for changing the first image, the external device changes the first image to the second image and displays the second image on the external device, and transmits the command to the image photographing apparatus as the user command.

20. The image photographing apparatus as claimed in claim 12, wherein the image inputter comprises a plurality of lenses, and the controller controls the image inputter to input the plurality of images having the different view points through the plurality of lenses.

21. The image photographing apparatus as claimed in claim 12, wherein the user command is input through the inputter, and the photographing command is input through the inputter.

22. The image photographing method as claimed in claim 1, wherein the changing the first image to the second image comprises displaying a plurality of sequential images each having a different view point.

23. A system comprising:

a plurality of image photographing apparatuses, each of the image photographing apparatuses comprising:

an image inputter configured to input a plurality of images having different view points for a subject;

a display configured to display a first image among the plurality of images input by the image inputter and display a view point indicating user interface (UI) that indicates a view point at which the first image is captured;

an inputter configured to input a user command;

a controller configured to, in response to the user command, change the first image to a second image having a view point which is different from that of the first image and control the display to display the second image, and, in response to a photographing command, acquire the second image; and a communicator configured to communicate with the other image photographing apparatuses using one or more communication protocols, wherein the controller of one of the image photographing apparatuses receives images from the other image photographing apparatuses through the communicator of the one image photographing apparatus, and controls the display of the one image photographing apparatus to display the received images concurrently in respective different portions of the display, and in response to a user command input to the one image photographing apparatus with respect to a displayed image of one of the other image photographing apparatuses, the controller controls the display to change the displayed image an image having a different view point from the displayed image.

24. The image photographing method as claimed in claim 1, further comprising: executing a UI rendering module that is stored in a storage of the image photographing apparatus; and processing the view point indicating UI by the UI rendering module to indicate a changed degree of the view point of the first image from a reference view point of a representative image.

25. The image photographing method as claimed in claim 24, further comprising:

controlling the displayed view point UI to point in the direction of the view point at which the first image is captured.

* * * * *